(12) United States Patent
Sims, III

(10) Patent No.: US 6,438,235 B2
(45) Date of Patent: *Aug. 20, 2002

(54) MEDIA CONTENT PROTECTION UTILIZING PUBLIC KEY CRYPTOGRAPHY

(75) Inventor: J. Robert Sims, III, Fort Collins, CO (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/129,370

(22) Filed: Aug. 5, 1998

(51) Int. Cl.[7] ................................................. H04L 9/00
(52) U.S. Cl. ........................ 380/285; 380/283; 380/282; 705/51
(58) Field of Search ................................ 380/282, 279, 380/283, 285; 705/51, 52, 54, 56

(56) References Cited

U.S. PATENT DOCUMENTS

| | | | | |
|---|---|---|---|---|
| 4,433,207 A | * | 2/1984 | Best ............................ | 713/190 |
| 4,903,296 A | * | 2/1990 | Chandra et al. ............. | 705/56 |
| 5,144,665 A | * | 9/1992 | Takaragi et al. .............. | 380/30 |
| 5,319,705 A | * | 6/1994 | Halter et al. .................. | 705/54 |
| 5,590,197 A | * | 12/1996 | Chen et al. .................... | 705/65 |
| 5,625,690 A | * | 4/1997 | Michel et al. ................. | 705/53 |
| 5,701,343 A | * | 12/1997 | Takashima et al. ........... | 705/51 |
| 5,754,649 A | * | 5/1998 | Ryan et al. ................... | 380/203 |
| 5,761,308 A | * | 6/1998 | Torii et al. .................... | 705/52 |
| 5,784,460 A | * | 7/1998 | Blumental et al. ............ | 705/51 |
| 5,857,021 A | * | 1/1999 | Kataoka et al. ............... | 705/54 |
| 5,915,018 A | * | 6/1999 | Aucsmith .................... | 380/201 |
| 5,991,399 A | * | 11/1999 | Graunke et al. ............. | 380/279 |
| 6,075,862 A | * | 6/2000 | Yoshida et al. ............... | 380/28 |

* cited by examiner

Primary Examiner—Albert Decady
Assistant Examiner—Steve Kabakoff

(57) ABSTRACT

A system and method for providing protection of content stored on a bulk storage media is disclosed. The technique for providing protection from unauthorized utilization of the content so stored is provided publicly in order to allow for those utilizing a conforming media device to master or generate content protected according to the present invention. Various ways in which to protect content are disclosed including verification of the authenticity of a particular media, utilization of an accepted list of media play-back devices and their corresponding published public keys in order to securely pass media content keys thereto, and utilization of an external contact to provide media content keys and/or updates of accepted media play-back devices.

29 Claims, 5 Drawing Sheets

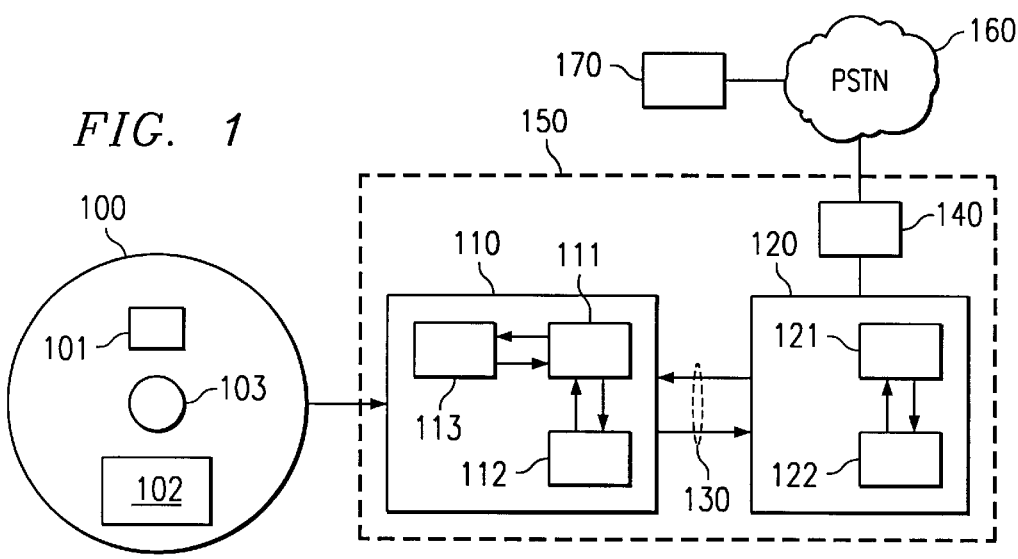

FIG. 1

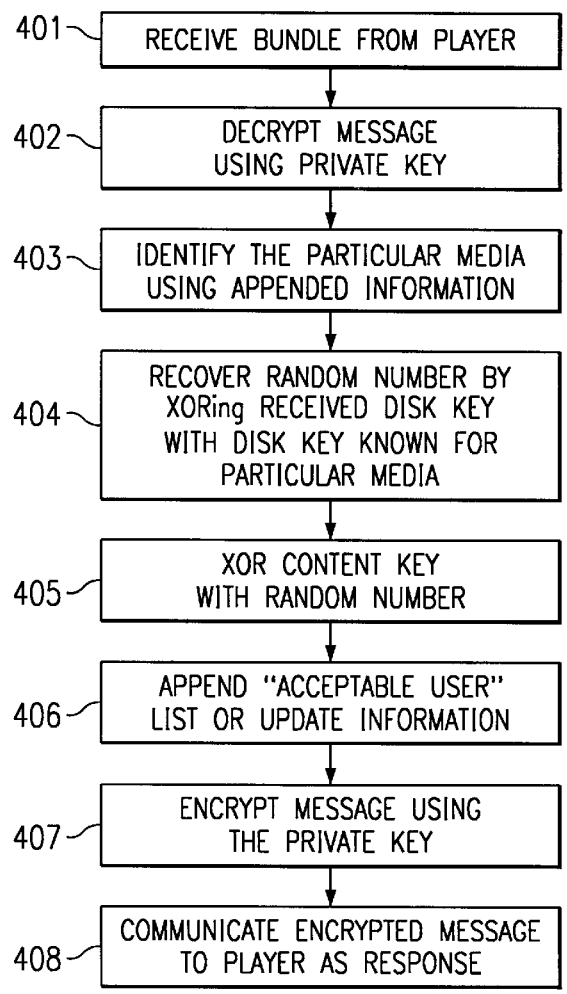

FIG. 4

401 — RECEIVE BUNDLE FROM PLAYER
402 — DECRYPT MESSAGE USING PRIVATE KEY
403 — IDENTIFY THE PARTICULAR MEDIA USING APPENDED INFORMATION
404 — RECOVER RANDOM NUMBER BY XORing RECEIVED DISK KEY WITH DISK KEY KNOWN FOR PARTICULAR MEDIA
405 — XOR CONTENT KEY WITH RANDOM NUMBER
406 — APPEND "ACCEPTABLE USER" LIST OR UPDATE INFORMATION
407 — ENCRYPT MESSAGE USING THE PRIVATE KEY
408 — COMMUNICATE ENCRYPTED MESSAGE TO PLAYER AS RESPONSE

MEDIA CONTENT PROTECTION UTILIZING PUBLIC KEY CRYPTOGRAPHY

TECHNICAL FIELD OF THE INVENTION

The present invention relates to protection of content stored on a bulk storage media and more particularly to a system and method for providing controlled utilization of the stored content through the use of public keys stored upon the media itself.

BACKGROUND OF THE INVENTION

Currently there are various schemes in place for providing controlled or secure access to content recorded on bulk media. However, these schemes often suffer disadvantages in requiring that the schemes themselves be kept secret in order to maintain security. Accordingly, the schemes may be implemented only by trusted parties in order to maintain the secret. Likewise, these schemes often rely on the total secrecy of cryptographic keys used by the scheme, as publication of such a key may result in loss of security for all or multiple parties using the scheme.

For example, DVD media, currently only protected for video content, utilizes a two part scheme: a cryptographic key for decrypting information recorded on the media is produced according to a predefined protocol and stored according to that protocol on a limited access portion of the media; and a cryptographic technique, also defined by the protocol, is utilized to securely pass that key to a play-back entity. Accordingly, in order to produce either a media device, i.e., media player, or media itself, there must be understanding of the whole scheme, i.e., how it works. Furthermore, there must be access to the keys, that have been predefined by this scheme, themselves. There must be a globally held secret among all of the people who produce players and all the people that produce media. Here, the security lies in keeping secret how the cryptographic keys are made and how the messages, i.e., the passing of the keys, are encrypted. If the protocol itself were revealed then all content, regardless of the particular entity which produced/recorded it, becomes compromised because, if the protocol were common knowledge, rogues could generate and/or intercept keys capable of decrypting protected content. Any compromise of the system will compromise all systems and media at the same time.

Additionally, as the media content key associated with the protected content is stored on the media itself, the above described scenario relies on all parts of the system honoring the security of the key. Therefore, an illegally designed media reader could pass the content key through to a device or entity which is not authorized to receive that key. Likewise, an illegally designed media reader could duplicate the raw data of the media, including the encrypted content and media content key stored thereon, on a second media and thus create an unauthorized copy conforming to the protocol described above. However, a media reader provided according to this scheme will prevent such unauthorized access/activity and, therefore, provide security because not all the raw data will be available. In particular the sectors where keys are hidden will not available on any consumer product because all of these products are produced under licenses providing that if the scheme is used, the device shall not allow particular operations.

Accordingly, for the system to provide protection to the content, the media decryption key stored on the media is read by a media reader, i.e., DVD disk drive, only in proper circumstances, i.e., an authorized play-back device requests the media content key according to a preestablished protocol, and thereafter, provided in encrypted form for communication to the play-back device. In this scheme, the media content key is passed after a key exchange is done such that when the key is handed from the media reader to the play-back device it is done encrypted. I.e., the play-back device would send its encryption key to the media reader, the media reader would read the media content key from the media, encrypt the media content key with the play-back device's encryption key, and pass this encrypted version of the media content key to the play-back device where it may be decrypted with the play-back device's (secretly held) decryption key for use of the media content key in accessing media content as provided by the media reader.

For example, in a host computer (here the play-back device) coupled to a DVD disk drive (the media device) via the computer's bus structure, information communicated between the computer and drive is exposed easily to rogues, or "hackers," and probing. Therefore, the media content key is passed over this bus only when it has been obscured by a key established through a key exchange between the drive and the host computer. However, in a stand alone player, where the media reading mechanism and the video play-back device are in one box, and the connection between them is somewhat secure, then such a key exchange and/or encryption of the media content key may be omitted in favor of decrypting the data directly internally.

The way this scheme is implemented, the media reader itself, as it may access the media content key, must honor the scheme and refuse to access the content key for unauthorized purposes. Likewise, as the play-back device is provided the content key, so too must the play-back device honor the protection scheme. However, in addition to relying on the security of the individual keys, details of the operation of the above described scheme itself, such as where and in what format content keys are written and the algorithm for conducting key exchanges, are kept secret in order to avoid the unauthorized retrieval/interception of keys and, therefore, compromising the security provided. Additionally, with the current scheme if an entity is able to generate legitimate protected media, that entity is also able to make illegal copies of other media as the secrets of the scheme must necessarily been revealed to this entity in order to allow the generation of legitimate protected media.

Accordingly, the protocol for encryption of the data and the generation of keys is only revealed by license, i.e., only trusted manufacturers of content and devices which read, write, or otherwise utilize this content are provided with the secrets of the protocol, and then only under the terms of a license agreement restricting use and dissemination of this secret information. Very few people or entities are able to obtain such a license, and its attendant secrets, in order to provide content and/or devices adapted in the nature of the protocol. As such, general content providers, such as small entities or entities providing content for internal or limited use, cannot protect their work as they have no way of recording such a key to the media in a secure manner that prevents illegitimate copying/utilization of protected content while allowing legitimate generation of secure disk. Therefore, there is no process that one can publicly use to generate such keys and, therefore, there is no process for those other than the licensed entities to record protected content compatible with this scheme.

A further need exists in the art for providing access to content with alternative techniques for security such as secure passing of keys stored on the media, communication with an external authorization center, and verification of the authenticity of the media.

A need therefore exists in the art for a technique providing secure access to the content of mass media which may be utilized by a great number of individuals and entities without risk of compromising security.

SUMMARY OF THE INVENTION

These and other objects, features and technical advantages are achieved by a system and method utilizing a technique, which itself is public, where only the individual keys used thereby need remain private. In order to be available to all desiring the protection of such a system, the rules for generating keys suitable for use according to the present invention are preferably public. As the technique itself, as well as the rules for generating cryptographic keys to be utilized therewith, are public, the present invention allows for its use by all those so desiring. Moreover, as it is the cryptographic keys themselves, or portions thereof, which are maintained securely in order to provide security according to the present invention, rather than relying on the secrecy of the technique for their use, compromise of the secret information will result in only a content provider using that particular key having access to content compromised.

The present invention operates to provide protection in addition to the limited access of content through the use of cryptographic keys. Specifically, the present invention is able to securely identify a piece of media as being an original. Likewise, the present invention is able to securely identify a play-back device as being authorized. Accordingly, devices or users of the media may be assured that interaction therewith is authorized as each end can securely identify the other and each end can securely send data to the other end.

Operation of the present invention is not to allow or disallow any particular transmission, but rather to obscure the content (information or data), using cryptographic methods, such that only a legitimate recipient can make use of that data, i.e., nobody but the content owner, or those authorized by him/her, is able to copy protected media content. To this end, the present invention utilizes public key algorithms well known in the art to provide cryptographic keys useful according to the present invention. However, the present invention provides a unique system and method for managing and utilizing these cryptographic keys.

Preferably, as in the above described prior art system, the media reader or disk drive (media device) honors the technique of the present invention. For example, through licensing of media device manufacturers, it may be ensured that these devices honor the technique. Therefore, sensitive information, such as the aforementioned content key, may be stored on the media without substantial fear that such information will be publically disseminated. Preferably, media devices unaware of the scheme will not crack it, i.e., a drive that can read/write raw the standard areas won't copy the copy protection information provided in a secured area. Accordingly, any attempt at violating the technique of the present invention, such as to read sensitive information stored on the media, is either unable to perform the technique at all, i.e., is unable to instruct a media reader to access restricted areas of the media, or if the device allows improper utilization there is a legal remedy available.

However, unlike the prior art system, where the scheme itself is secret, the present invention does allow the public at large to generate their own protected content without requiring license to the technology or requiring any secret information that they do not themselves generate. This is because the only secrets in the present technique are the keys themselves and, thus, allowing the rules for generating the keys to be public. Accordingly, media devices may be adapted to allow for limited access to secure areas of the media in order to provide for mastering of content protected by the present invention. This allows anyone to be able to generate their own protected media.

According to the present invention, a public/private key pair is used where the private key is known only by the manufacturer or content provider for provision only to select, or authorized, decoders or play-back devices. Therefore, each individual device, sets of associated devices, or manufacturers devices may utilize a different private key known only to these devices. Likewise, in a preferred embodiment, a different content key would be known by each piece of media, which if compromised only presents a security risk for that media.

However, the media, or the media device operating therewith when the media is strictly a passive device, needs to know the play-back devices public key. As long as the media is guaranteed that the public key does in fact belong to a particular owner, i.e., is authentic and is associated with an approved or authorized device, the system is secure. Accordingly, the owner or manufacturer of the play-back device is, in fact, best off not by keeping that public key a closely held secret but by broadcasting it to world. This public dissemination of the public key decreases the chance of a rogue fraudulently distributing a public key as belonging to an approved or authorized entity. For example, company X publishes a public key widely identifying itself as the source, it is much more difficult for company Z to latter fool the public into believing that a subsequent public key is company X's public key. Therefore, in the preferred embodiment, the public keys of approved play-back devices are actually published on the media.

By publication of the play-back device's public keys, the present invention not only operates to securely transmit information, but also provides for securely identifying either or both ends, i.e., the media and/or the play-back device, as being legitimate. Accordingly, any information storage scheme providing an area that is fully readable and an area providing controllable or restricted access may be utilized according to the present invention.

Unlike the aforementioned prior art scheme, there is no widely held secret, i.e., the play-back providers and the media generation providers all having to know how the whole scheme works, including the values for the keys. As the only parts of the present invention that are secret are the private keys themselves, no secrets need to be shared among parties. Accordingly, each manufacturer, whether a manufacturer of media or devices operable therewith, can keep their own secrets. Moreover, these secrets may be kept such that the true secrets are known only by very few people, in such a way that actually nobody knows the true secret where, for example, the secret is embedded and shipped via random generation which is then destroyed before it is ever noted, or in a hidden away where, for example, certain persons are provided partial information with respect to the keys and some plurality thereof are needed to reconstruct the key. Moreover, as these private keys may be embedded within circuitry useful in encrypting/decrypting information according to the present invention, the private keys may not even be revealed to any party.

In an alternative embodiment, rather than storing the content key in an area of limited access on the media, for retrieval by the media device and subsequent transmission to the play-back device, the key is securely stored by the media which actively operates to securely transmit this key to the play-back device without ever disclosing the key to the media device. Accordingly, the active component utilized for hiding this key not in the media device or disk drive. Instead, it is a portion of the media, such as an electronic circuit including a processor and memory operating under control of an internal algorithm. Therefore, the content key, which is stored on the media within the aforementioned memory, may be hidden and, preferably utilizing the public key of the play-back device passed through the media device to the play-back device without its ever being revealed to the media device. Through the above mentioned secure identification of the play-back device, the active media of this alternative embodiment may be assured that the media key is not revealed to unauthorized entities. Alternatively, the fact that the content key is encrypted using a public key associated with an authorized play-back device provides confidence that it may only be used by that play-back device barring a security breach of the private key.

Another alternative embodiment of the present invention utilizes an external source to acquire a content key, such as for "pay-per-view." Accordingly, rather than a content key stored on the media, an identifier string, such as may be used to authenticate the media, may be stored for provision to an external source, utilizing public key encryption according to the present invention, in order to acquire a content key useful with the desired content.

Additionally, or alternatively, contact with the external source may provide up-dated information with respect to authorized decoders or play-back devices suitable for use with the media. For example, a list of authorized public keys may be up-dated by such communication in order to allow a media device to securely provide a content key to a decoder not originally included as an authorized decoder.

A technical advantage of the present invention is that a technique known to the public, and therefore available for use by the public, may be utilized to prevent useful copying of protected content.

A further technical advantage of the present invention is that playability is allowed in both dedicated players and computers, as well as providing for the play-back in later authorized devices.

A still further technical advantage of the present invention is provided in its ability to protect both video information and computer information. Moreover, such protection may include interaction with an external authorization center, such as pay-per-view techniques, via such commonly available communication networks as phone or Internet.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates a media system adapted according to a preferred embodiment of the present invention;

FIG. 4 illustrates a flow diagram of the operation of an external authorization center according to a preferred embodiment of the present invention.

DESCRIPTION OF THE INVENTION

Figure 2:
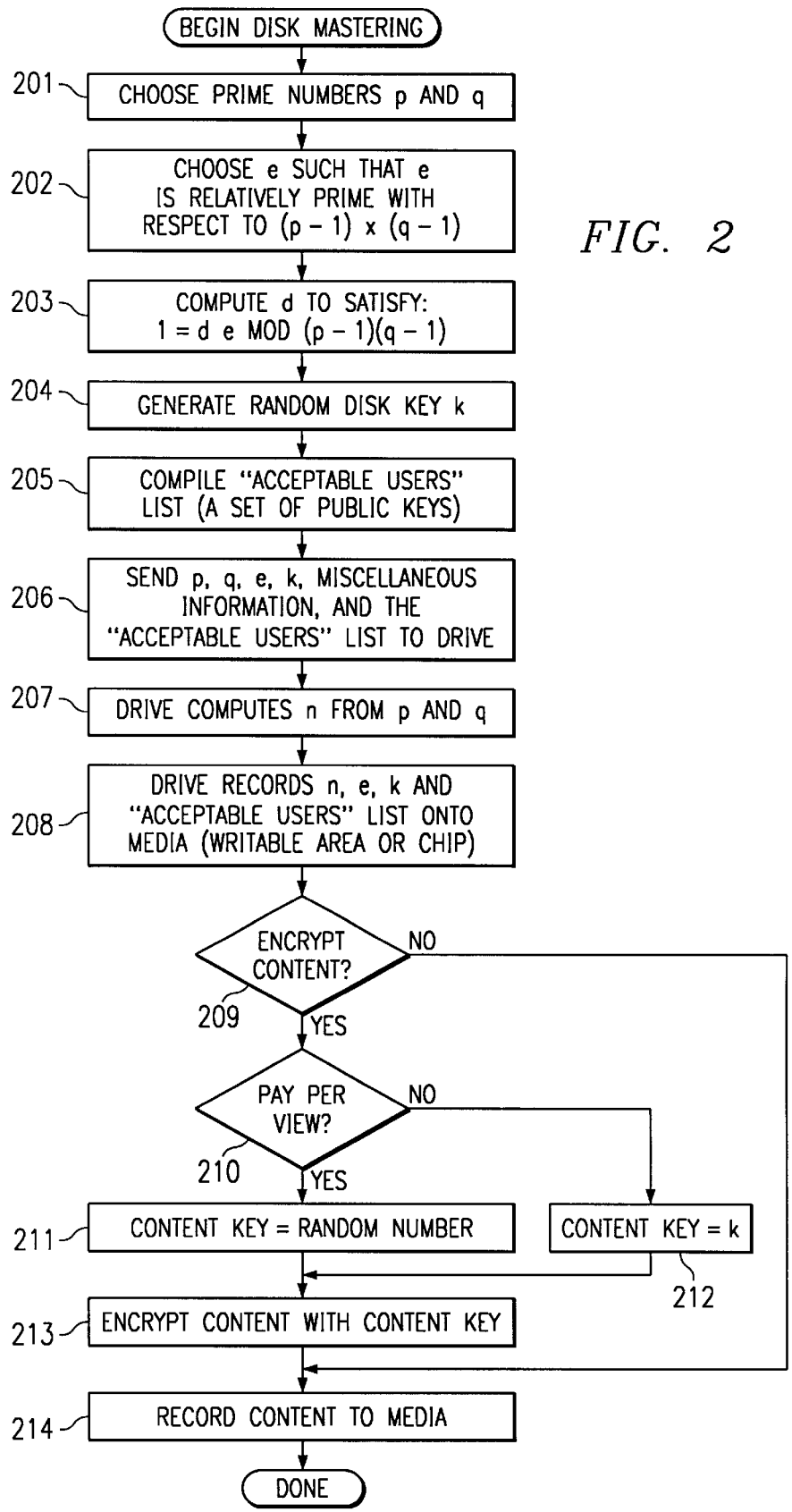
FIG. 2 illustrates a flow diagram of recording a disk including content protected according to a preferred embodiment of the present invention.

In understanding the concepts of the present invention it is helpful to refer to a specific embodiment wherein the present invention is utilized. Accordingly, described herein is an embodiment where the present invention is utilized with bulk media storing information suitable for use by digital systems, such as digital video information commonly stored on DVD optical disks. However, it shall be appreciated that the present invention is not so limited and may in fact be utilized with any information storage scheme providing an area of secure or restricted access to the contents therein.

Directing attention to FIG. 1, a system adapted according to the present invention is shown including media 100, media device 110, and play-back device 120. Media 100 includes unprotected storage area 102, providing general access to information stored therein, and protected storage area 101, providing secure or restricted access to information stored therein. In a preferred embodiment, protected storage area 101 is a predetermined area of media 100 which media devices honoring the technique of the present invention will not provide access to the information therein except according to the present invention. In an alternative embodiment, protected storage area 101 is an active area, i.e., includes autonomous control over the data stored therein, such as through the use of a processor unit and associated control algorithm, which itself will not provide access to the information therein except according to the present invention.

Also shown in FIG. 1 is media device 110, which may be for example an optical or magnetic disk drive, adapted to accept media 100 and interact therewith, such as to read and/or write information. Media device 110 includes interface 113, which may be a magnetic head or laser and photo diode combination for example, adapted to interface with media 100 to allow interaction between media device 110 and media 100. Interface 113 is coupled to processor 111 which, in addition to receiving information as provided from media 100 through interface 113 and providing information through interface 113 to media 100, operates to control the operation of interface 113. For example, where media 100 is a disk, such as is well known in the art, controller 111 may provide motion control of interface 113 in order that physical blocks and sectors of media 100 may be accessed as desired.

Also coupled to processor 111 is memory 112. Memory 112 may provide any number of functions with respect to the operation of media device 110. For example, memory 112 may store a control program utilized by processor 111 in operation, such as in performing the above mentioned motion control of interface 113 as well as to operate according to the present invention. Additionally, memory 112 may buffer information passed between play-back device 120 and media 100 as well as provide an environment for active functions of media device 110 such as the handling cryptographic keys and/or their encryption for secure transmission.

Play-back device 120 of FIG. 1 is coupled to media device 110 through bus 130 to comprise player 150. Included within play-back device 120 is processor 121 which, in addition to receiving information as provided from media 100 through media device 110 and providing information through media device 110 to media 100, operates to disseminate and/or accept the information communicated with media 100. For example, processor 121 may operate to play information recorded on media 100 to a monitor (not shown) attached to play-back device 120. Likewise, processor 121 may operate to accept information to be recorded on media 100 from a user interface (not shown) attached to play-back device 120.

Also coupled to processor 121 is memory 122. Memory 122 may provide any number of functions with respect to the operation of play-back device 120. For example, memory 122 may store a control program utilized by processor 121 in operation, such as to operate according to the present invention. Additionally, memory 122 may buffer information passed between play-back device 120 and media 100 as well as provide an environment for active functions of play-back device 120 such as the handling cryptographic keys and/or decryption of media content provided to play-back device 120. Accordingly, processor 121 and memory 122 may operate as a decoder suitable for utilizing the content of media 100.

Bus 130 coupling media device 110 and play-back device 120 may be an unsecured bus, such as a personal computer (PC) input/output (I/O) bus where media device 110 is a disk drive and play-back device 120 is a PC. However, both media device 110 and play-back device 120 may be disposed within a substantially secure environment, thus providing some security to bus 130, such as where player 150 is an integrated unit as is the case for television top DVD players. In such an embodiment processor 111 of media device 110 and processor 121 of play-back device 120 may be provided as a single processor. Likewise, memory 112 of media device 110 and memory 122 of play-back device 120 may be a single memory.

Optional communication device 140, coupled to clearing house 170 through public switched telephone network (PSTN) 160, is shown in FIG. 1 coupled to play-back device 120. Communication device 140 may be utilized to update information stored within play-back device 120 or media device 110, such as lists of authorized decoders and/or their associated public keys, as well as to authorize particular transactions between play-back device 120 and media 100, such as to provide for "pay-per-view" service. Although shown coupled directly to play-back device 120, communication device may be coupled elsewhere in the system, such as to media device 110, if desired. Likewise, although shown as providing communication with clearing house 170 through PSTN 160, such communication may be provided through any number of communication links such as a local area network (LAN), a wide area network (WAN), the Internet, a cable system, a satellite system, or the like.

As described above, preferably protected storage area 101 of media 100 is an area which provides secure or limited access to information stored therein. For example, in a preferred embodiment of the present invention, protected storage area 101 is a predefined area of the media, such as a first or final sector of the usable area of the media, to which media device 110 does not provide general access. This restricted access to protected storage area 101 may be provided by the agreement of the manufacturer of media device 110 to honor the technique of the present invention. Alternatively, restricted access to protected storage area 101 may be provided by altering media device 110 to enable access to a portion of standardized media not physically or generally possible to be accessed by typical prior generation media devices and, again, limiting access thereto by media device 110 by agreement of the manufacturer to honor the technique of the present invention. The latter mentioned alternative provides additional security for the information of protected storage area 101 in that media devices not specifically adapted to operate according to the present invention are physically prevented from access. However, a disadvantage to this alternative is that media protected according to the present invention would not be suitable for use in such non-conforming media devices.

In an alternative embodiment of the present invention protected storage area 101 is an active portion of media 100, such as may be provided by a processor and associated memory. Accordingly, information, such as cryptographic keys utilized according to the present invention may be stored therein and provided externally only upon select conditions. Accordingly, reliance upon a media device honoring the present technique may be avoided and instead replaced with secure active portions of the media itself. As such, the provision of cryptographic keys, or other sensitive information, may be passed through the media device to an authorized play-back device without revealing this information to the media device or its ability to use such secrets. Therefore, it shall be appreciated that, although discussed below with respect to a media device performing these functions, the active portion of the media itself may in fact perform the functions.

Such an active portion of media 100 may be provided an interface to interact with media device 110 and/or play-back device 120 through electrical connections such as may be provided at a center hub portion of the media (hub 103 of FIG. 1) disposed to couple with complementary connections disposed within media device 110. Of course, such an embodiment requires not only adaptation of media 100, but also media device 110 in order to provide operation according to the present invention. Alternatively, media 100 may be adapted to include a surface area having active components disposed thereon adapted to provide interaction with media device 110 according to the media device's unaltered media interface. For example, where media 100 is a magnetic media, protected area 101 may include circuitry, similar to the coils of a magnetic read/wright head disposed along a sector or track of media 100, controllable to provide magnetic patterns readable by media device 110 and to receive magnetic patterns written by media device 110 to communicate selected information there through according to the present invention. Likewise, where media 100 is an optical media, protected area 101 may include circuitry, such as light emitting diodes and photo diodes disposed along a sector or track of media 100, to provide optical patterns readable by media device 110 and to receive optical pattern written by media device 110.

The active portion of media 100 may be provided in components such as integrated circuits, or "chips," containing the public key algorithms. Accordingly, these circuits may have embedded in them the private key, which may never be available externally because the chip never reveals it. The basis of public key/private key encryption is that only if the private key is known, information can be decrypted with the corresponding public key. Therefore, there is no need to ever know the private key. The presence of the authentic private key may be verified by generating a random number, encrypting it with the public key, sending the encrypted information to the chip, allowing the chip to decrypt the random number using the private key, and again encrypt the random number using the private key. If the random number is presented by decrypting the returned encrypted string with the public key, there must be a valid private key utilized within the chip.

It shall be appreciated the above exchange of a random number may be utilized in validating either end of a communication. Moreover, only one encryption/decryption cycle need be completed to prove the recipient has a key corresponding to the issuers key. However, the reencryption of the decrypted random number provides a high level of confidence that the recipient did not simply guess the correct random number.

It shall also be appreciated that, although the use of random numbers is described herein, other information may be utilized in such verification and the below mentioned information disguising techniques. For example, particular patterns of information, such as time and/or day information may be used. Likewise, particular information run through a hash or other algorithm to uniquely alter the data may be used. Of course, the more "random" or unpredictable the data so used is, the less likely that it may be guessed by the recipient.

In another alternative embodiment, protected area 101 is not a discrete portion of media 100, but rather is information provided in a secured fashion within the unprotected area of media 100. For example, information which is to be protected, or provided limited access, according to the present invention may be disbursed throughout unprotected area 102 in a manner such that its recovery is impossible or unlikely except to devices operating according to the present invention. Accordingly, in an embodiment of the present invention, information stored in protected area 101 is encoded as errors in the information stored in unprotected area 102. These errors are predetermined to be correctable, such as through CRC error correction algorithms known in the art, in order to provide error free utilization of the information stored in unprotected area 102. However, the placement of such errors and/or particular patterns of the errors are utilized to encode the information of protected area 101. Such an embodiment may be utilized to prevent unauthorized copying as a system providing anything other than a raw data copy will likely used the CRC algorithms to "correct" those errors prior to their being written on the copy.

It shall be appreciated that, although described above in the alternative, the embodiments of providing protected area 101 may be combined. For example, portions of the information of protected area 101 may be stored according to different ones of the above embodiments. Likewise, all the information of protected area 101 may be provided in multiple ones of the embodiments, such as to provide maximum compatibility with media devices and/or play-back devices.

Having described embodiments for the storage of protected information, reference is now made to the below table for an understanding of a preferred embodiment of information stored in protected area 101. Preferably, all values are recorded in Little Endian format.

| Offset | Size | Name |
| --- | --- | --- |
| 0 | 128 | 1024 bit media key (n) |
| 128 | 128 | Reserved |
| 256 | 128 | 1024 bit media key (e) |
| 384 | 128 | Reserved |
| 512 | 4 | Decoder Key File CRC |
| 516 | 12 | Reserved |
| 528 | 8 | Disc Key |
| 536 | 8 | Reserved |
| 544 | 1 | SCMS count |
| 545 | 1 | Encryption Type |
| 546 | 1 | Public Key flags |

-continued

| Offset | Size | Name |
| --- | --- | --- |
| 547 | 1 | Region Code |
| 548 | 2 | Number of Key Extents |
| 550 | 26 | Reserved |
| 576 | N_K * 8 | Key Extents |

The media key (n), preferably a 1024 bit key, and media key (e), also preferably a 1024 bit key, are each one half of the media public key. Generation of this key and its use will be described in detail below.

Preferably, the media will have a list of decoders, identified through the Public Key flags of the preferred embodiment, that the author has deemed acceptable for use with the media. Accordingly, the Public Key flags indicate which public keys, associated with authorized decoders, the drive is allowed to use to send Disc Keys. If the bit is set, as shown in the table below, the drive will allow to the Report Key command to return the Disc Key encrypted with the corresponding public key.

| Bit | Description |
| --- | --- |
| 0 | The public key in the key sector shall be valid for reporting the Disc Key. |
| 2–6 | Reserved |
| 7 | Public Keys not listed elsewhere are acceptable. |

The public keys indicated as allowable by the Public Key flags are preferably stored on the media itself as indicated by the Key Extents of the preferred embodiment. Preferably each entry of the Key Extents is a pair of 32 bit unsigned integers. The first integer specifies a sector number of an authorized decoder key and the second integer specifies a byte count of that decoder key. The Number of Key Extents contains the number of extents that contain the key file. On read-only media, this number is preferably one.

According to the present invention, an author or provider of content may review the products of companies X, Y and Z to determine if they have guaranteed that their product does not compromise the material that is to be protected. If it is determined that the way in which companies X and Z have protected their information, the content provider records public keys for X and Z on the media as authorized decoders and/or play-back devices and sets the Public Key flags accordingly. This list of public keys may be the only one utilized in passing a content key from the media to a play-back device and, thus, only these approved decoders or play-back devices will be able to utilize the content key. Although described as the only devices authorized, it shall be appreciated that below is described a method for updating this list to allow for inclusion of later approved or developed devices.

In operation, the play-back device will request the media key encrypted for use with a particular decoder, i.e. X. The drive will look for X as an acceptable key, as indicated in the Public Key flags, and, utilizing the Key Extents to locate and retrieve the proper public key, encrypt the media key accordingly to send it along.

As these keys of the authorized decoders are their public keys, there is no need to record them secretly on the media. Accordingly, the preferred embodiment of the present invention records these keys within unprotected area 102. However, as the proper presence of such a public key will be utilized to allow useful play-back of content, it is preferred that these keys are provided in a read only (or write once only) area of the media in order that the list is not altered to include a rogue key.

Additionally, in order to provide protection of the keys, and therefore the decoders, utilized with a particular media and its content, Decoder Key File CRC, preferably CRC 32 of all of the decoder keys, is utilized to detect tampering with these keys. Accordingly, if one were to edit or alter the decoder key file or the key extents, the CRC will not be correct for the altered file. In the preferred embodiment Decoder Key File CRC is 4 bytes but could be extended, for example to as much 16 to utilize other message digest algorithms such as MD5.

The Disk Key as stored in the secure area may be used in an application specific manner. For example, in some cases it may be used to encrypt/decrypt content, i.e., content key. Public key encryption is typically not desirable for a significant quantity of data because public key encryption is extremely slow and processor intensive, accordingly, the above mentioned public key algorithms may be used to transfer a key for a symmetrical encryption system, such as DES or a IDEA or any number of other algorithms wherein the key must remain secret at each end. However, in other cases the Disk Key may be an identification string or information utilized by an external source in authorizing use of the content of the media. Use of the Disk Key in such cases is described in detail below. Regardless of the actual form of the Disk Key, preferably its contents are never to be made available unencrypted. Preferably, the Disk Key field is 8 bytes which is sufficient to hold a 56 bit DES key.

The SCMS count is preferably used by writeable drives to determine if copies are allowed. If copies are allowed, the SCMS also provides information with respect to how many generations of copies are allowed. Preferably, the SCMS count is decremented upon the completion of an authorized copy by a media device. For example, the following sequence could be used to copy a protected disk:

(1) Insert the original disk.
(2) Host instructs the drive to "Read Secure Area." If the allowed copy count field is zero, the drive generates an error.
(3) Drive caches information from the secure area (it is preferably NOT returned to the host).
(4) Insert a blank disk.
(5) The host instructs the drive to "Write Cached Secure Area."
(6) The drive decrements the allowed count field and writes the sector to the disk.

Encryption Type is preferably a flag indicating suggested usage as shown in the table below. Accordingly, in the preferred embodiment, commands to implement all cases will work in all cases as these commands do not change their behavior if different Encryption Types are selected. For example, a disk originally designed for Standard Video can use the same sector data with the Standard ROM identification technique. Another use is to use the pay per view technique to allow playback on decoders not originally included on the media.

| Encryption Type | Description |
| --- | --- |
| 0 | Standard Video |
| 1 | Pay per use |
| 80h | Standard data |

The Region Code indicates in which regions the disk is to be allowed to be used. Each bit preferably corresponds to a region.

According to a preferred embodiment of the present invention, all passing of encrypted information fits in the SFF 8090 Send Key/Report Key structure. Accordingly, key type codes as set forth below are preferably utilized. The Key Type specifies the type of encryption used on the disk.

| Key Type | Description |
| --- | --- |
| 0h | Disk is encrypted according to CSS. |
| 1h | Disk is protected by the technique of the present invention. |
| 2h | Reserved |
| 3h | Reserved |

The below descriptions are for Key Type 1 (key types of the present invention).

For operation according to the preferred embodiment of the present invention, the SFF 8090 Report Key is as follows:

|  | 7 | 6 | 5 | 4 | 3 | 2 | 1 | 0 |
| --- | --- | --- | --- | --- | --- | --- | --- | --- |
| 0 | Operation Code (A4h) ||||||||
| 1 | LUN (Obsolete) || Reserved ||| Key Type |||
| 2 | LBA ||||||||
| 3 | ||||||||
| 4 | ||||||||
| 5 | ||||||||
| 6 | Key Source ||||||||
| 7 | Reserved ||||||||
| 8 | Transfer Length ||||||||
| 9 | ||||||||
| 10 | AGID ||| Key Format |||||
| 11 | Vendor Specific ||| Reserved || NACA | Flag | Link |

Where the Key Source and Key Type fields are new, allowing for multiple schemes to exist command space.

Preferably the Key Source specifies the source of the Disk Key as set forth below:

| Key Source Value | Key Source | Description |
| --- | --- | --- |
| 00h | generated | Disk Key is all zeroes |
| 01h | generated | Disk Key is the current random number. |
| 02h | Media | Disk Key is the temporary Disk Key. Initialized to zero upon AGID grant. |
| 04h | Media | Disk Key is recorded in key sector |
| 08h | Media | Disk Key is encoded as DSV exceptions |
| 10h | Media | Disk Key is encoded as ECC exceptions |
| 20h | Media | Disk Key is in user data space |
| 40h | Media | Disk Key is in the sector header of the key sector |
| 80h | Media | Disk Key is in the border zone |

Typically, only one or two bits are expected to be set. If two bits are set, one will usually be the current random number. In a preferred embodiment, if more than one bit is set, the Disk Key is the XOR of all requested keys.

The Key Format defines the type of key requested. The preferred definitions for Key Format are as set forth in the table below.

| Key Format | Description |
| --- | --- |
| 0 | Request AGID. Regenerate the random number for the AGID. (common to all Key Types) |
| 1 | Report Disk Key encrypted with most recent Public Key sent. |
| 2 | Report Media Public Key |
| 3–3Eh | Reserved |
| 3Fh | Report the Key Types on the medium (common to all Key Types) |

Send Key:

| Key Format | Description |
| --- | --- |
| 1 | Send current public key. |
| 2 | Send Disk Key. The drive shall store this value as the temporary Disk Key for the current AGID. |

Having described the information provided in a secured area of the media according to the present invention, a preferred embodiment of the storage of this information to the media will be described with reference to FIG. 2. Shown in FIG. 2 is a preferred embodiment of the mastering or creation of a media recorded and protected according to the present invention.

At step 201 prime number p and q are chosen. Preferably p and q are each 512 bit primes. Of course, larger or smaller primes may be utilized according to the present invention depending upon the desired level of difficulty desired in breaking any cryptographic keys generated therefrom.

At step 202 one half of the public key (e) is chosen such that e is relatively prime with respect to (p−1)×(q−1). As described below e and n each comprise one half of the public media key of the preferred embodiment of the present invention. The value n is derived from the relationship n=p×q. Accordingly, secured content (s), decryptable only through use of a corresponding private key, may be derived from clear content (c) through the relationship:

$$s_{pub} = c^e \bmod n$$

and clear text contents (c) may be derived from secured content (s), encrypted through the use of a corresponding private key, may be derived through the relationship:

$$c = s_{pvt}^e \bmod n$$

At step 203 one half of the private key (d) is computed to satisfy the relationship:

$$1 = d\ e\ \bmod\ (p-1)(q-1)$$

As with the public key above, n is utilized as the remaining half of the private key. Accordingly the secured content (s) encrypted utilizing the public key above may be decrypted to provide clear content (c) according to the relationship:

$$c = s_{pub}^d \bmod n$$

and secured content (s) decryptable only through use of the above described corresponding pubic key may be derived according to the relationship:

$$s_{pvt} = c^d \bmod n$$

At step 204 the Disk Key k is generated. As described above, this key may be a cryptographic key, such as a symmetric key conforming to the DES standard, utilized in encrypting and decrypting the content of media 100 provided in unsecured area 102, i.e., a content key. Alternatively, Disk Key k may be identification information utilized in identifying the particular media or content, such as to an external source of clearing house for provision of a proper decryption key or other information useful in utilizing the content of media 100.

At step 205 a list of "acceptable users," or decoders and/or play-back devices authorized to utilize the content of the media, is compiled. This list of acceptable users preferably includes both the identification of such users as well as their public keys.

At step 206 the values of p, q, e, and k, as well as the list of "acceptable users" and other miscellaneous information, such as content information for an external source, are provided to a media device operable according to the present invention. It shall be appreciated, as secure area 101 of the present invention is preferably only accessible through restricted access, that only when these parameters are provided in accordance with the proper operation of the present invention will a conforming media device accept and record this information on media 100. Therefore, in the preferred embodiment the prime factors p and q must be provided to the media device, rather than the value n, in order to establish that the provider is actually the originator of the keys utilized.

Accordingly, at step 207, the media device computes n from the values of p and q provided thereto. If a rogue has been able to intercept the values e and n, such as through unauthorized access to secured area 101 of media 100, a media device operating according to the present invention will prevent a useful unauthorized copy being made as either no values for p and q will be available or the rogue will be unable to select values suitable for use with the portions of the key previously generated.

At step 208 the media device records n, e, k, and the list of acceptable users on to media 100 within secure area 101. It shall be appreciated that, although discussed with respect to the media device providing restricted access to the secured area, as described above the present invention may utilize a portion of media 100 having intelligence disposed therein, such as a small chip set interfaced with the media device as described above. Accordingly, storage of this information may be through interaction with such an intelligence associated with the media rather than relying on the media device to restrict access and to perform operations such as the aforementioned computation of the value n.

At step 209 it is determined whether the particular implementation of the present invention includes the encrypting of content to be stored in unsecured area 102 of media 100. If no encryption of this content is desired, i.e. encryption is utilized for media authentication only, then operation proceeds to step 214 wherein the content is recorded to media 100.

However, if encryption of this content is desired, then operation proceeds to step 210 wherein a determination is made as to whether the implementation is to utilize information provided from an external source, such as a clearing house utilized in providing "pay-per-view" services. If information from an external source is not desired, operation proceeds to step 212 wherein the content key is set to the disk key.

If information from an external source is to be required in order to utilize the content of media 100, operation proceeds to step 211 wherein the content key is selected at random, or by any other appropriate method. It shall be appreciated that the content key of step 211 is provided to the clearing house, or other external agent, in order to provide for the later use of the content of media 100. However, this key is not stored on media 100, thus requiring contact with the clearing house for use of the content.

Regardless of whether an external source is to be utilized or not, the content to be stored within unsecured area 102 may be encrypted with the content key (step 213) and recorded to media 100 (step 214). Accordingly, both steps 211 and 212 proceed to step 213 for encryption of the content with the content key.

Figure 3A:
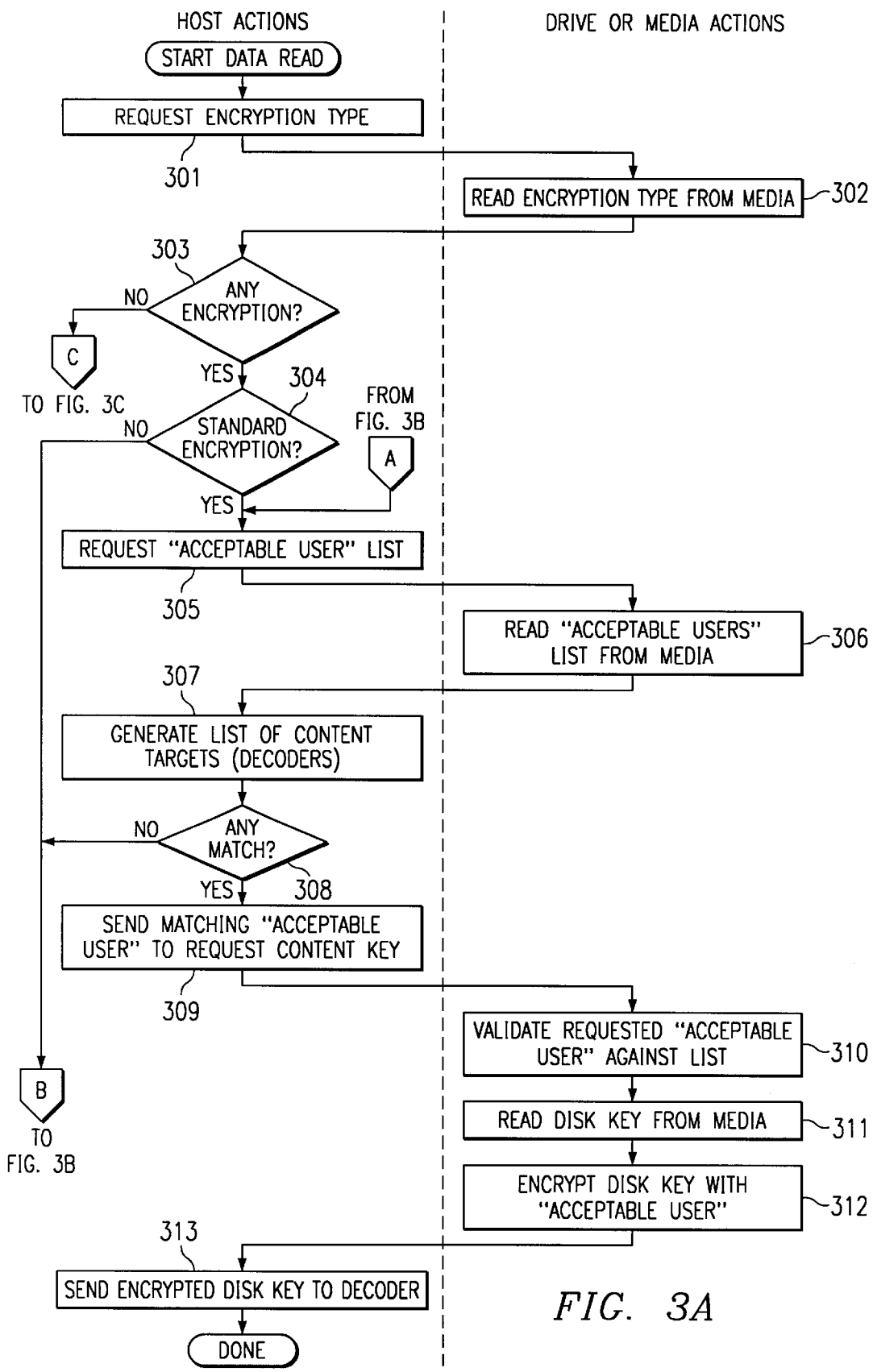
FIGS. 3A through 3C illustrate a flow diagram of the use of content protected according to a preferred embodiment of the present invention.
Figure 3B:
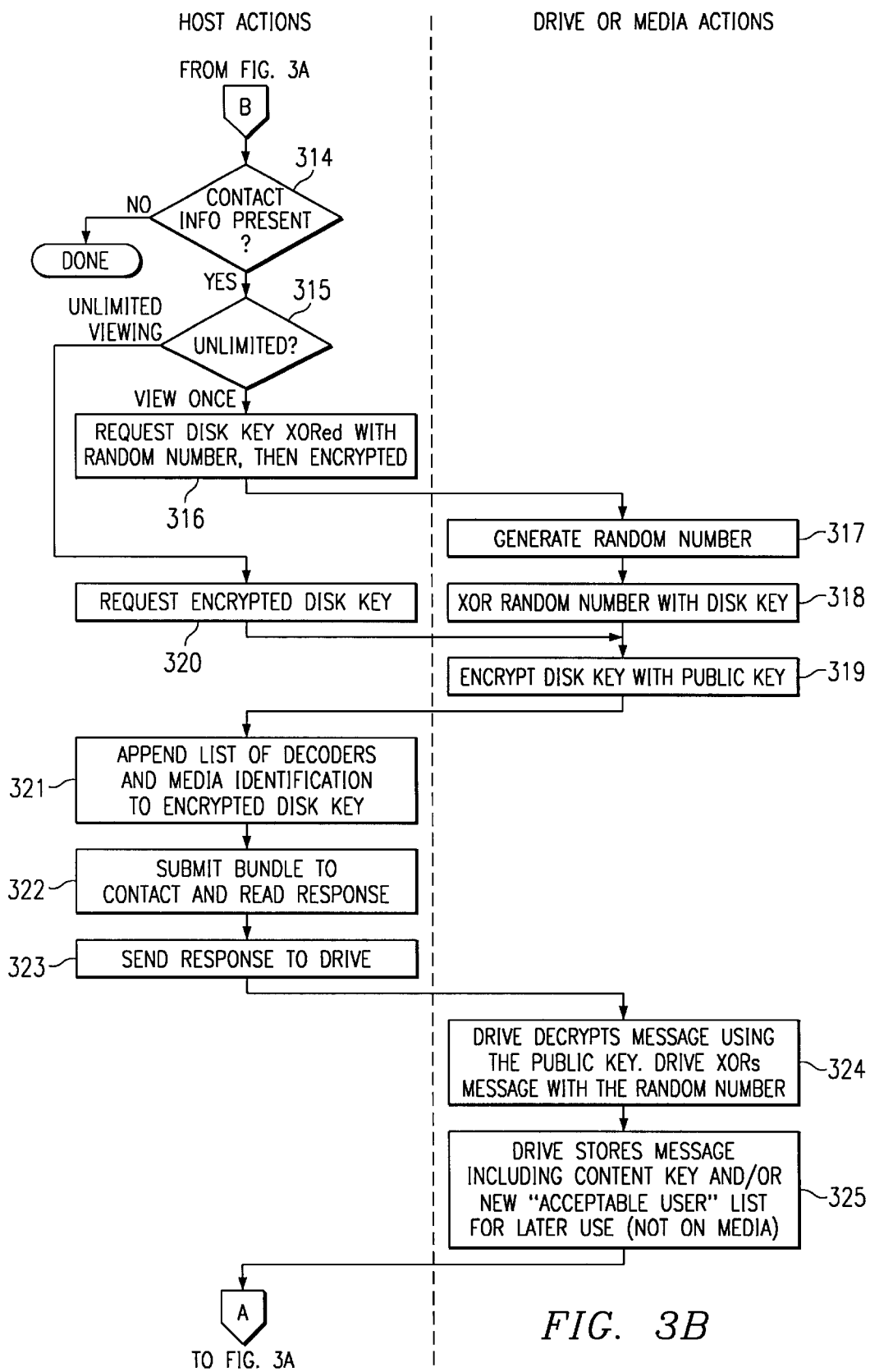
Figure 3C:
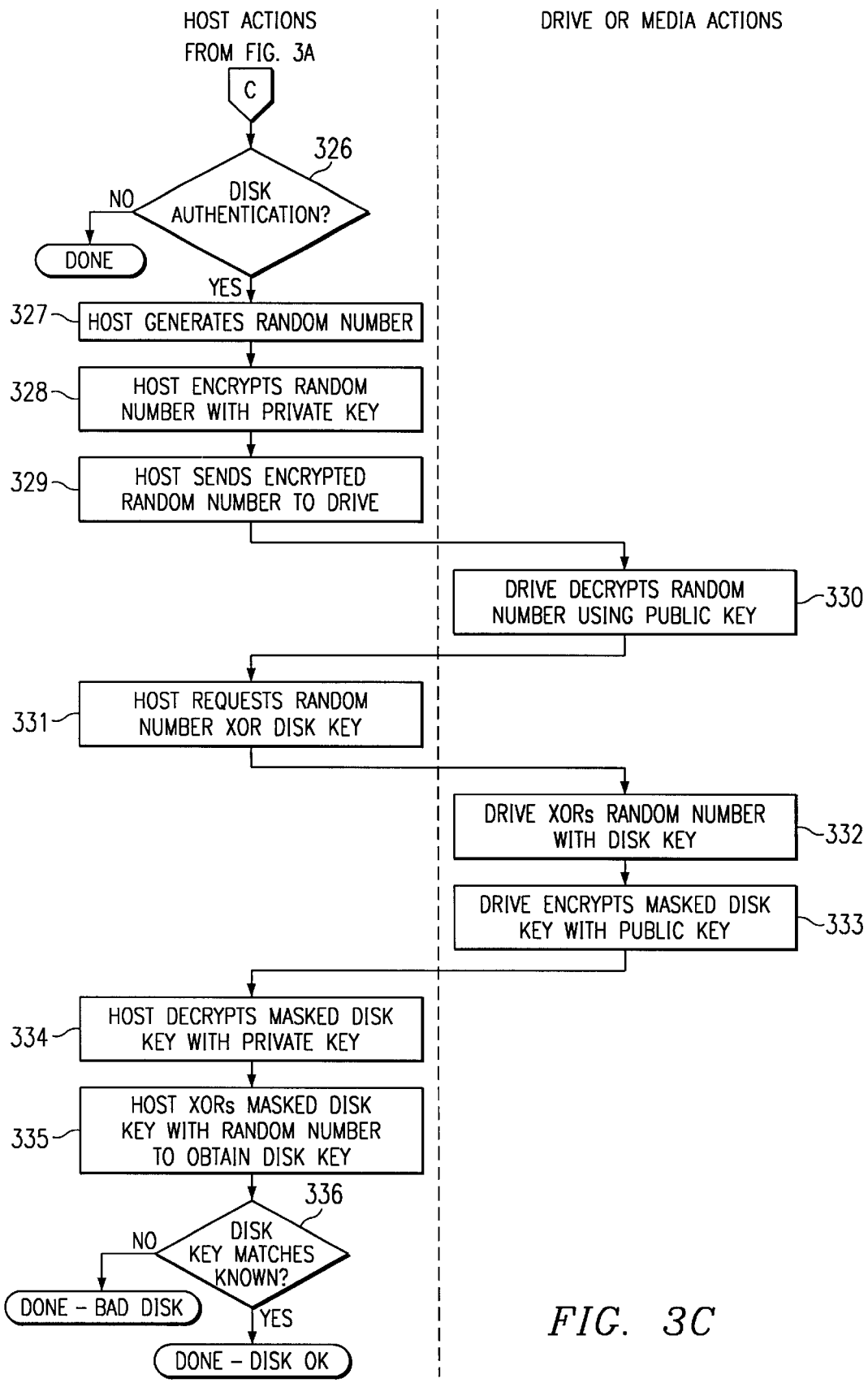

Having described in detail the mastering of a disk according to a preferred embodiment of the present invention, reference is now made to FIG. 3 wherein the utilization of content provided according to the preferred embodiment of the present invention is shown.

At step 301 the play-back device requests the encryption type of media 100. In response the media device reads the encryption type from the media (step 302). It shall be appreciated that, although shown above in the preferred embodiment as being recorded in the secure area of the media, the encryption type information may be stored anywhere upon the media, if desired.

At step 303 a determination is made as to whether encryption is utilized with respect to the content of the media. If it is determined that no encryption is utilized then operation proceeds to step 326 in order to determine if disk authentication is utilized according to the present invention.

However, if it is determined that encryption is utilized to protect the content, then at step 304 a determination is made as to whether the encryption is "standard." If it is determined that encryption utilized to protect the content is other than standard, operation proceeds to step 314 associated with the use of an external source in the utilization of content as described in detail below. If the encryption is standard, operation proceeds to step 305 wherein the list of "acceptable users" is requested. Thereafter, at step 306 the media device reads the list of "acceptable users" from the media and provides this information to the play-back device. The play-back device generates a list of content targets, i.e., decoders available thereto, at step 307.

At step 308 a determination is made as to whether any of the content targets available to the play-back device match those included in the list of "acceptable users" authorized to operate with the particular media. If no match is found, operation proceeds to step 314 associated with the use of an external source in the utilization of content, in order that an updated list of "acceptable users" may be utilized, such as by communicating information when coupled to the clearing house such as a list of public keys for which it is acceptable to work with. Accordingly, if a new decoder is built or authorized after a particular media is published, the new decoder public encryption key scheme may be used through communication with a third party provider to get the authorization to use a new decoder.

For example, the media device may establish communication with a clearing house and identify itself to the service provider, such as through the use of one of the acceptable keys on the list being that of the person who owns the content itself, i.e., the media public key. Accordingly, the media device honoring the technique of the present invention is allowed to pass the disk key to this content provider using this public key provided on the media possibly accompanied with a request to the host, either protected or not, identifying a decoder upon which play-back is desired. In receiving a legitimate disk key encrypted with the content provider's public key, the content provider may have a high level of confidence in this being a legitimate disk and, therefore, may send back an authorized public key for the particular decoder, or a list of authorized public keys, encrypted with the private key corresponding to the content provider's public key found on the media. The media device is then able to decrypt that list with this key.

In the preferred embodiment, the retrieval of an authorized key is automatically performed when a suitable authorized key is not found on the media, as is provided in the steps outlined above. However in an alternative embodiment, the up-dating of the authorized decoders is performed in maintenance cycle, such as may be performed at predetermined intervals, such as at night or periods of non-use of the player.

If a match is found as between the "acceptable user" list and the list of content targets available at the play-back device, then at step 309 a request for the content key is sent identifying the matching "acceptable user." At step 310 the requested "acceptable user" is validated against the list of "acceptable users" and, provided it is indeed a match, the disk key, here the content key, is read from the media (step 311) and encrypted with the public key of the matching "acceptable user" (step 312). Thereafter this encrypted disk key is provided to the play-back device decoder at step 313 to allow meaningful use of the content recorded thereon and operation according to the present invention is concluded. It shall be appreciated that, as the disk key is encrypted utilizing the public key of the particular decoder, that only this device may actually decrypt the content of media 100 even if a rogue were to emulate the above preceding steps.

If it is determined that encryption utilized to protect the content is other than standard (step 304) or if none of the decoders available to the play-back device are included in the "acceptable users" list (step 308), a determination is made as to whether external contact information is present on the media (step 314). This contact information may be recorded in unsecured area 102, as the particular clearing house contacted may provide a cryptographic key necessary in utilizing the content of media 100 which may not be defeated by fraudulently directing, i.e., surreptitiously recording contact information on media 100, a media device and/or play-back device operating according to the present invention to a rogue external contact. Moreover, as information provided from the clearing house is preferably encrypted utilizing the private media key, i.e., d and n discussed above, a rogue clearing house will not be able to provide a proper response unless this private key is acquired.

If, at step 314, it is determined that no contact information is present, i.e., there is no available external source of information for utilizing the content of media 100, then operation according to the present invention is concluded. However, if it is determined that contact information is present, then operation proceeds to step 315 where a determination is made as to whether the content key to be retrieved from the external source is to allow unlimited use of the content or a single use.

If only a single use is to be allowed of the content, i.e., a user must request a content key each time the content is to be utilized, such as might be desirable where a fee for use is desired to be extracted for each such use, operation of the present invention proceeds to step 316. At step 316 a request is made for an encrypted result of the disk key XORed with a random number. Accordingly, at step 317, the media device generates a random number, i.e., a unique value which is chosen at random for use according to the present invention and which is held only for a period of time sufficient to complete this one iteration of the present invention. At step 318 the disk key is XORed with the random number and, thereafter, at step 319 the XORed disk key is encrypted with the public media key.

However, if unlimited use is to be allowed of the content, i.e., the content is to be unlocked permanently with respect to a particular play-back device upon the payment of a single fee or a verification of an authorized copy of the media, or where the information to be provided by the clearing house is "authorized user" up-date information, operation of the present invention proceeds to step 320. At step 320 a request is made for an encrypted disk key. This request may include transmission of a private cryptographic key or other means by which the returned data packet may be further protected in order to present someone with the public media key for intercepting the returned data packet and decrypting its contents. Thereafter, as described above, step 319 encrypts the disk key with the public media key.

It shall be appreciated that, in the alternative to the play-back device determining whether one time or unlimited use is to be allowed, the media device of the present invention may make this determination, such as through reference to information stored on media 100, for example within a reserved area of secure area 101. Accordingly, rather than the decision presented at step 315, the play-back device may request a disk key and the media device XOR that key with a random number if one time use is to be provided or XOR that key with zero (0) if unlimited use is to be provided.

At step 321 a list of the decoders available to the play-back device, as well as information identifying the media, are appended to the encrypted disk key. It shall be appreciated that the information identifying the media may be stored on the media either within the secured area, such as one of the reserved areas described above, or within the unsecured area, and may be provided from the media for inclusion accompanying the encrypted disk key such as at step 319.

The information identifying the media, the list of available decoders and the encrypted disk key are provided to the clearing house at step 322 and a response therefrom is awaited. It shall be appreciated that this information packet may be provided to the clearing house from the player utilizing a communication device such as the aforementioned modem coupled via a public switched telephone network or the Internet. Of course other means by which data communication may be accomplished which are well known in the art or may later be developed may be utilized according to the present invention.

The clearing house receives the data packet from the player and preferably operates according to the embodiment described with reference to FIG. 4 described below. Accordingly, a content key suitable for use with the content of media 100 is returned to the player, preferably encrypted utilizing the private media key described above.

At step 323 the response from the clearing house is provided to the media device where it is decrypted using the public media key (step 324). As described above, a random number is utilized in the one time use embodiment of the present invention. This random number is utilized by the clearing house to XOR the content key for provision to the player. As such a rogue may not simply capture the data packet returned from the clearing house for later re-submission to the player for repeated use of the content as the random number, discarded after a single iteration of the present invention, is required by the media device in extracting the content key. Moreover, someone in possession of the media public key will not be able to decrypt the data packet and retrieve the content key without also knowing the random number. Accordingly, at step 324, where the single use embodiment is utilized, the information decrypted is XORed with the random number to reveal the content key an/or other information provided thereby.

At step 325 the media device may store the content key for repeated use, where allowed and/or may store a new or updated "acceptable user" list for subsequent use. Alternatively, or additionally, where the content key provided by the clearing house is useful in unlocking the media for multiple uses, i.e., the key is not XORed with a random number retained only for a single iteration of the present invention, the play-back device or other host may memorize the data packet for subsequent provision to the media device at the appropriate time.

Although described with respect to up-dating an "acceptable use" list, it shall be appreciated that the present invention may operate to indicate particular ones of the decoders identified as authorized by the Public Key flags and/or Key Extents which are no longer acceptable for use according to the present invention. For example, where a particular private key has been compromised, the up-date information received from the clearing house may indicate one of the public keys may no longer be used. Accordingly, a check against such a "revoked" list may be performed, such as at step 306, to disallow the use of such private keys.

Operation proceeds to steps 305 through 313 as described herein above. However, it shall be appreciated that where the content key is provided in the data packet from the clearing house, i.e., pay-per-view, step 311 operates to utilize this content key rather than the disk key stored on the media. Likewise, where external information is utilized to up-date the "acceptable user" list, the information at step 306 includes the up-dated information provided by the clearing house.

It shall be appreciated that the content key and/or up-dated "acceptable user" list information acquired from the clearing house may be stored within media 100 if desired. However, as unauthorized recording of this information may be utilized in avoiding the protection offered according to the present invention, recording of this information on the media is preferably done within the secure area.

If it is determined that no encryption is utilized to protect the content of media 100 (step 303) a determination is made as to whether disk authentication according to the present invention is to be utilized (step 326). If no disk authentication is utilized, then operation according to the present invention is concluded and the play-back device utilizes the content of media 100 accordingly.

However, if disk authentication is utilized, at step 327 the play-back device generates a random number. Thereafter, the play-back device encrypts this random number with the private media key (step 328). The encrypted random number is communicated to the media device at step 329. Thereafter, the media device decrypts the random number utilizing the public media key stored in the secure area of media 100.

The play-back device requests that the random number be XORed with the disk key stored within the secure area of media 100 (step 331). In response, at step 332, the media device XORs the random number with the disk key. The media device then encrypts the result of the XORed random number and disk key with the media public key and provides this data packet to the play-back device (step 333). The play-back device decrypts the XORed random number and disk key utilizing the private media key (step 334) and XORs this decrypted information with the random number (step 335).

At step 336 a determination is made as to whether the disk key obtained from the media according to the above steps matches an expected or known disk key. If there is a match, the media is authentic, i.e., a simple copy of the information provided within unprotected area 102 has not been performed. However, if there is no match of the disk key, then the media is not authentic.

Although the above preferred embodiment describes the use of standard encryption, external authorization, and media authentication in a single embodiment, it shall be appreciated that any combination of these techniques may be utilized. For example, where a pay-per-view only device is utilized, only those steps associated with external authorization need be provided such a system. Similarly, where it is not anticipated that media authentication will be utilized, devices may be adapted to include only those steps associated with standard encryption and external authorization.

Directing attention to FIG. 4 a preferred embodiment of operation of the clearing house in response to a request by a player is shown. At step 401 the clearing house receives the data packet of step 322 from the player. The data packet is decrypted utilizing the private media key corresponding to the public media key stored on media 100 (step 402). At step 403 the particular media is identified using information within the received data packet. It shall be appreciated that the clearing house may identify the particular media through available information which does not expressly identify the media. For example a particular public key may provide sufficient identification of the media. Likewise, information gleaned from the communication, such as a uniform resource locator (URL) or automatic number identification (ANI) of the requesting player may be utilized according to the present invention.

At step 404 the random number generated by the media device is recovered by the clearing house by XORing the decrypted disk key and random number XORed by the media device with the disk key as known by the clearing house. This random number is utilized to XOR the content key, to be utilized by the play-back device in meaningful use of the encrypted content of media 100, for provision to the player. An "acceptable user" list, or up-date thereof, may be appended to the information to be provided to the player at step 406. Thereafter, the information to be provided to the player is encrypted using the private media key (step 407) and communicated to the player (step 408).

Preferably, file system information of the media is not encrypted. However, the data within files may be encrypted with the content key. Accordingly, a control file preferably indicates which files are encrypted and which are not. This allows protected and freely distributable information to coexist on the same media, thus enabling selected content to be protected, such as movies, while allowing unprotected distribution of other content, such as promotional trailers.

In the preferred embodiment, the encryption sequence is restarted for each sector of the media. This maintains the sector addressability of the media and allows for random access of the content provided thereon.

As described above, a media device operating according to the present invention allows for the producing of protected content by providing for the authorized writing of information within the secure area. However, to prevent such access to the secure area from enabling rogues to alter legitimately mastered media, writing to this area is performed by providing the two prime numbers that are the factor of the media key (n). The disk key is provided encrypted with the private key corresponding with the public key sent. The media device multiplies the two primes and record the product in the media key (n) field. The media device does not need to verify that the input numbers are prime. A user can generate insecure keys, but cannot reproduce a secure key. The disk key will be obtained for recording upon the media by the media device by decrypting it using the public media key computed from the primes p and q.

Accordingly, authoring a protected disk is possible, as the author has the primes. An illegal copy operation will not succeed because the key cannot be written without knowing the corresponding prime factors. Even if a user obtains the keys, he will not be able to record them.

Commercial writing may be accomplished as described above. However, for further protection, the 1024 bit key may either be a prime itself or the product of two primes in which one of the primes is larger than 512 bits. This would prevent copying the key with a consumer level product even if the key could be factored.

It shall be appreciated that the present invention may be implemented upon a dedicated player by the dedicated player reading the disk key from the secure area. If pay-per-view is supported, the dedicated players may implement the public key protocols as described above.

Additionally, it shall be appreciated that the present invention may also be implemented upon a computer system. However, a ROM drive, such as typically found in computer systems, performs no decryption of data delivered via its host interface. Preferably, MPEG decoder based decryption is utilized, such that decryption is performed by the MPEG decoder using the key provided by the drive. In order to maintain protection of the content, the MPEG decoder should not deliver the content to any interface that allows recording.

It shall be appreciated that, although the above example has been discussed with respect to a DVD formatted bulk storage device, the techniques described herein may be utilized with any number of such bulk storage devices. For example, the techniques of the present invention may be utilized with CD ROM formatted bulk storage devices with only simple differences as to where the secure area is hidden and how it was marked as not readable and how the disk key is hidden.

Additionally, it shall be appreciated that according to the preferred embodiment of the present invention, as shown above, no unique host or drive identifier is available or required. This is allow for changing hardware due to upgrades or failure.

Although the present invention and its advantages have been described in detail, it should be understood that various changes, substitutions and alterations can be made herein without departing from the spirit and scope of the invention as defined by the appended claims.

What is claimed is:

1. A method for preventing unauthorized access to content stored on a media, comprising:
   receiving a request to access content stored on a media from a particular play-back device including an identifier indicative of a type of device of said particular play-back device;
   matching said identifier to a list of authorized play-back device types, said list being stored on said media; and
   when said identifier matches one entry of said list of authorized play-back device types, performing the steps of:
   (i) retrieving a public key associated with said one entry from said media;
   (ii) retrieving a content key utilized to encrypt said content from said media;
   (iii) encrypting said content key with said public key, and
   (iv) communicating said encrypted content key to said particular play-back device.

2. The method of claim 1 further comprising:
   controlling a drive unit reading said media to prevent said particular play-back device from directly accessing portions of said media which contain the content key.

3. The method of claim 2 wherein said content key is interspersed at different portions of said media.

4. The method of claim 1 wherein said content key is encoded as errors on said media via an error correction code.

5. The method of claim 1 wherein said content key is stored on an active portion of said media.

6. The method of claim 5 wherein said active portion includes a processor which is operable to only communicate said content key in encrypted form.

7. The method of claim 1 wherein said content key is a private key.

8. The method of claim 1 further comprising the steps of:
   receiving an encrypted random number from said particular play-back device; and
   decrypting said encrypted random number;
   wherein said step of encrypting said content key with said public key, includes the sub-step of performing an exclusive-or (XOR) operation with said content key and said random number.

9. The method of claim 1 wherein said media is a mass distributed media.

10. A system for preventing unauthorized utilization of content, comprising:
    a processor operating under a set of instructions to control access to content stored on a media utilizing access information stored on said media and validation information received from a particular play-back device;
    said content being encrypted with a media cryptographic key, said media cryptographic key being stored on said media;
    said access information including a list of identifiers of a plurality of authorized play-back device types;
    said access information further including a respective device cryptographic key for each authorized play-back device type of said plurality of authorized play-back device types;
    said set of instructions including code to receive said validation information from said particular play-back device in a request to read said content on said media;
    said set of instructions including code to determine whether said received validation information matches one of said identifiers of said list of identifiers; and
    said set of instructions including code to communicate said media cryptographic key encrypted by said respective device cryptographic key associated with said particular play-back device type to said particular play-back device when said validation information matches one of said identifiers.

11. The system of claim 10 wherein said processor controls a drive unit for recovering information from said media.

12. The system of claim 11 wherein said processor controls said drive unit by preventing said play-back device from directly accessing portions of said media which store said media cryptographic key.

13. The system of claim 11 within said media cryptographic key is stored at interspersed locations on said media, and wherein said set of instructions includes code for identifying said predetermined interspersed locations.

14. The system of claim 13 wherein said media cryptographic key is encoded as errors in data via an error correction code.

15. The system of claim 10 wherein said processor is implemented on an active portion of said media.

16. The system of claim 15 wherein said media cryptographic key is stored on said active portion.

17. The system of claim 16 wherein said processor prevents said particular play-back device from directly accessing said active portion to obtain said media cryptographic key.

18. The system of claim 10 wherein said media cryptographic key is a private key.

19. The system of claim 10 wherein each respective device cryptographic key is a public key.

20. The system of claim 10 wherein said set of instructions further includes code to receive an encrypted random number, code for decrypting said encrypted random number utilizing a respective device cryptographic key, and wherein said code to communicate is operable to perform an exclusive-or (XOR) operation on said media cryptographic key with said random number.

21. The system of claim 10 wherein said media is a mass distributed media.

22. A method for preventing unauthorized access to content, comprising:
    storing content on a media encrypted with a content key, wherein said content key is stored on said media, and wherein said media is distributed in mass;
    storing information indicative of authorized media player types on said media;
    storing a respective public key for each authorized media player type of said authorized media player types on said media;
    receiving from a particular media player a request to access said content from said media, wherein said request includes an identifier specifying a type of said particular media player;

validating said particular media player by matching said identifier against said information indicative of authorized media player types; and when said validating step determines said particular media player is authorized, sending said content key encrypted by said respective public key associated with said particular media player to said particular media player.

23. The method of claim 22 further comprising:

controlling a drive unit to access data stored on said media.

24. The method of claim 23 wherein said step of controlling a drive unit prevents said particular media player from directly accessing portions of said media which store said content key.

25. The method of claim 22 wherein said content key is interspersed through different portions of said media.

26. The method of claim 25 wherein said content key is encoded as errors in an error correction code.

27. The method of claim 22 wherein said content key is a private key.

28. The method of claim 22 wherein said steps of receiving, validating, and sending are performed by a processor on an active portion of said media.

29. The method of claim 22 wherein the step of sending further comprises:

receiving an encrypted random number;

decrypting said random number; and performing an exclusive-or (XOR) operation on said content key.

* * * * *